(12) United States Patent
Macchi et al.

(10) Patent No.: US 8,741,175 B2
(45) Date of Patent: Jun. 3, 2014

(54) DESICCANT COMPOSITION FOR MOISTURE-SENSITIVE ELECTRONIC DEVICES

(71) Applicant: Saes Getters S.p.A., Lainate (IT)

(72) Inventors: Giorgio Macchi, Samarate (IT); Alessandra Colombo, Milan (IT); Paolo Vacca, Milan (IT); Roberto Giannantonio, Oleggio (IT)

(73) Assignee: Saes Getters S.p.A., Lainate (IT)

( * ) Notice: Subject to any disclaimer, the term of this patent is extended or adjusted under 35 U.S.C. 154(b) by 0 days.

(21) Appl. No.: 13/980,306

(22) PCT Filed: Mar. 15, 2013

(86) PCT No.: PCT/IB2013/052087
§ 371 (c)(1),
(2), (4) Date: Jul. 17, 2013

(87) PCT Pub. No.: WO2013/153469
PCT Pub. Date: Oct. 17, 2013

(65) Prior Publication Data
US 2014/0070140 A1    Mar. 13, 2014

(30) Foreign Application Priority Data
Apr. 13, 2012   (IT) ............................... MI2012A0601

(51) Int. Cl.
*C09K 3/00*    (2006.01)
*B01D 53/28*    (2006.01)

(52) U.S. Cl.
USPC .............................. 252/194; 502/64; 438/115

(58) Field of Classification Search
USPC ......................................................... 252/194
See application file for complete search history.

(56) References Cited

U.S. PATENT DOCUMENTS 5,591,379 A   1/1997  Shores et al.
6,673,436 B2  1/2004  Fujimori et al.

FOREIGN PATENT DOCUMENTS

EP    1788034 A2   5/2007
WO    98/00352 A1  1/1998

OTHER PUBLICATIONS

PCT International Search Report mailed on May 31, 2012 for PCT/IB2013/052087 filed on Mar. 15, 2013 in the name of Saes Getters S.P.A.
PCT Written Opinion mailed on May 31, 2012 for PCT/IB2013/052087 filed on Mar. 15, 2013 in the name of Saes Getters S.P.A.
Database WPI, Week 200442, Thomson Scientific, London, GB; AN 2004-444303 XP002688944 & JP 2004 143310 A.

*Primary Examiner* — Peter F Godenschwager
(74) *Attorney, Agent, or Firm* — Steinfl & Bruno LLP

(57) ABSTRACT

A desiccant composition containing a polymeric binder and a dispersion of powders of desiccant materials is described. The desiccant composition has desiccant powders that are dispersed at least in part in form of micro-aggregates of desiccant particles surrounded by a polymeric encapsulating material having a different composition with respect to the polymeric binder.

14 Claims, 1 Drawing Sheet

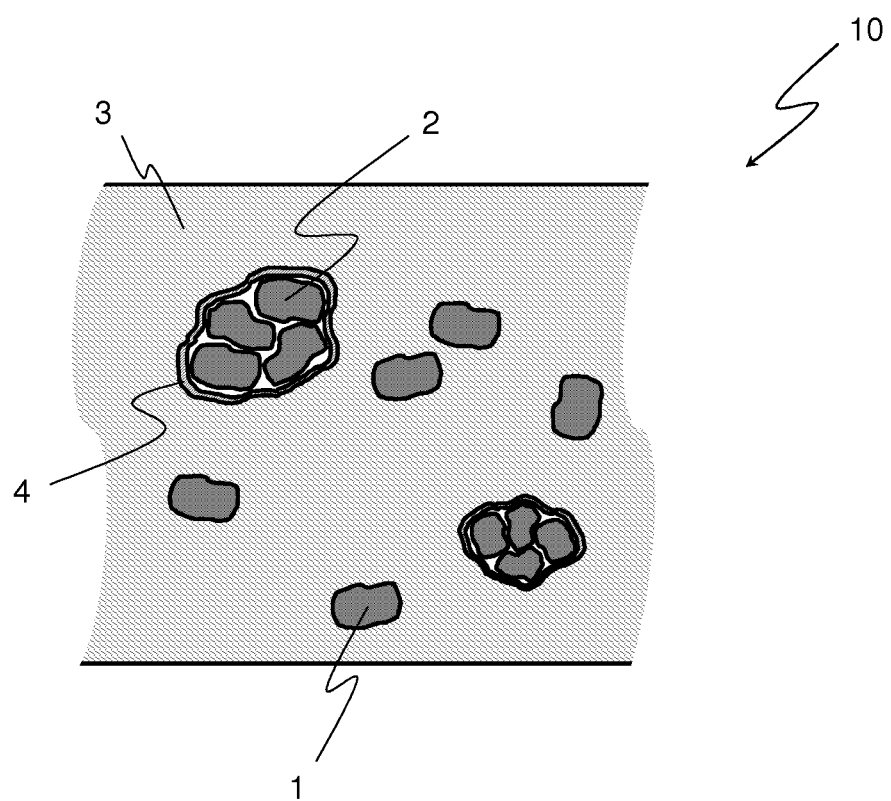

DESICCANT COMPOSITION FOR MOISTURE-SENSITIVE ELECTRONIC DEVICES

CROSS REFERENCE TO RELATED APPLICATIONS

The present application is the US national stage of International Patent Application PCT/IB2013/052087 filed on Mar. 15, 2013 which, in turn, claims priority to Italian Patent Application MI2012A000601 filed on Apr. 13, 2012.

The present invention relates to an improved desiccant composition consisting in desiccant material powders dispersed in a polymeric matrix and suitable to control the humidity level inside a packaged electronic device in order to prevent a premature failure thereof and/or a degradation of its performance.

Various electronic and industrial devices require humidity levels in the range of about 0.1 to 5000 ppm of water vapor because their performance is affected by moisture. Examples of these devices are micro-electromechanical devices (MEMs) and micro-opto-electromechanical devices (MOEMs), opto-electronic devices for telecom applications, medical implantable devices (pace-makers, defibrillators), organic electronic devices such as OLEDs and OLETs.

Their preservation is typically achieved by encapsulation of the devices using sealants suitable to reduce humidity transmission from the external environment in association with the insertion of a desiccant composition inside the enclosure containing the moisture-sensitive device.

Molecular sieves, silica gel and aluminosilicates can physisorb humidity and they are typical desiccant materials used to maintain the humidity level within the above range. However they have a relatively low moisture capacity, which moreover is a function of the temperature within the enclosure of the device: moisture that has been sorbed at room temperature could be undesirably released when higher temperatures are reached in the enclosure, as for example in the range between 60 and 100° C. that are very common to be achieved when the device is in its operative mode.

Alkaline and alkaline-earth oxides, sulphates, metal halides and perchlorates often chemically absorb moisture with lower minimum equilibrium value and higher moisture capacity than physisorbing materials. However, when they are exposed to a relatively high moisture concentration (e.g. during a manufacturing process of an electronic device), they could saturate therefore becoming ineffective to prevent the failure or degradation of the device. In fact, differently from the physisorbing materials, chemisorbing materials usually require a reactivation temperature that is too high and therefore the reactivation process is inapplicable during or after manufacturing of the device.

The U.S. Pat. No. 5,591,379 describes a composition having moisture gettering properties and consisting in desiccant material powders finely dispersed in a binder which is permeable to water vapor. The binder may be a polymer, a porous ceramic or a porous glass, all of them having the requisite to affect the moisture sorption speed as little as possible. U.S. Pat. No. 5,591,379 therefore is focused on maintaining the sorption properties of the desiccant composition but it is silent on how to achieve this goal while allowing the exposure of the desiccant to humidity for the period requested by the device manufacturing processes (i.e. 4-24 hours).

The U.S. Pat. No. 6,673,436 discloses a moisture absorbing body that can be located within the housing of an electronic device. The absorbing body consists in calcium oxide (CaO) as main gas-absorbing powders dispersed in a resinous material, and it may be associated with an additional coating layer on one or both faces of the absorbing sheet consisting in the CaO dispersed in the resinous binder in order to better control the moisture absorbing performance of the body. Even if a decrease in the saturation caused by exposure to humidity before the closing of the sensitive device can be achieved, U.S. Pat. No. 6,673,436 is silent on how to optimize it in order to associate this protective effect with the preservation of the absorption properties, i.e. residual moisture capacity (up to 80% of the overall capacity) for the final application. Moreover, it is very difficult to obtain an homogeneous and controlled thin film on a resinous binder and therefore it is not guaranteed to achieve the final absorption properties that make it suitable for use in electronic devices and easily usable within their manufacturing processes.

It is an object of the present invention to provide a polymeric composition suitable to desiccate an environment surrounding a moisture-sensitive electronic device sealed in an enclosure, suitable to be manipulated and used in manufacturing processes involving the exposure of the composition to a non-dried environment before the sealing step, overcoming the drawbacks existing in the prior art.

In a first aspect, the present invention relates to a desiccant composition containing a polymeric binder and a dispersion of a first amount of powder of at least one desiccant material dispersed in said polymeric binder, said first powder being directly in contact with the polymeric binder, said desiccant composition further containing a dispersion of a second amount of powder of at least one desiccant material, said second powder being in the form of aggregates surrounded by a shell of an encapsulating material having a different composition with respect to the polymeric binder.

The invention will be described with reference to FIG. 1, representing in a schematic way the structural properties of the composition suitable to achieve the desired effect. The different components in FIG. 1 have been represented in a way suitable to improve the understanding of the main technical features of the invention, without the intention of maintaining the real dimensional proportions among them.

The moisture sorbing composition 10 consists therefore in desiccant powders 1, 2 dispersed in a polymeric matrix 3 but, differently from the state of the art, said powders are present in two different forms: a first amount of a first desiccant powder 1 dispersed "as is" is present in the polymeric matrix 3 together with a second amount of a second desiccant powder 2 dispersed in an encapsulated form. This encapsulated form consists in powder particles 2 surrounded by a polymeric shell 4 having a different chemical composition with respect to the binder 3, resulting in a kind of polymeric capsules with micrometric dimensions suitable to contain powder particles.

The first and second desiccant materials 1, 2 according to the present invention can be selected among, but are not limited to, alkaline and alkaline-earth oxides such as lithium oxide, magnesium oxide, calcium oxide, strontium oxide, barium oxide, molecular sieves and aluminosilicates. Generally, they can be two different kinds of humidity absorbing powders, but the case in which they are the same kind can be anyway suitably considered in order to carry out the present invention. In fact, when the same kind of desiccant material is used, the coexistence of at least an encapsulated desiccant material powder 2 and at least a free or non-encapsulated desiccant material powder 1 is the main characteristic according to the present invention in order to achieve an effective control of the absorption rate, i.e. to allow an exposure to air for the desired period without saturation or excessive reduction of the absorption rate when the composition is inserted in the moisture-sensitive device.

In a preferred embodiment of the present invention, the total solid content in the desiccant composition (i.e. the overall desiccant power weight that is contained in the composition) is comprised between 30 and 60% in weight with respect to the composition weight. Moreover, the weight ratio between the encapsulated form of the desiccant material and the non-encapsulated form of the desiccant material is selected between 1:2 and 1:6, preferably between 1:2 and 1:5, wherein the weight of the encapsulated form of the desiccant material is intended as the sum of the weights of the powder and of the polymeric encapsulating material containing it.

Desiccant powders suitable to be used in the formulation of the composition object of the present invention can have dimensions preferably comprised between 100 nm and 10 μm and the micro-capsules consisting in said desiccant powder 2 encapsulated in a polymeric shell 4 usually have a dimension comprised between 5 and 50 μm, preferably between 10 and 40 μm. Said micro-capsules can be previously obtained starting from the selected desiccant powders by means of spray-drying, vibrational nozzle (atomization), interfacial and emulsion polymerization. In an alternative embodiment it might be useful to use at least one between said first and second desiccant materials (1, 2) having a surface modification with suitable organic groups in order to improve the dispersion homogeneity in the polymeric components of the composition (i.e. the polymeric binder or the polymeric shell);

In its preferred embodiment, the desiccant composition of the invention is a dispensable composition, having a viscosity comprised between 10.000 and 1.000.000 cP and the polymeric binder 3 can be suitably selected, for example, among epoxy resins, epoxyacrilic resins, perfluoropolyethers resins and siloxane matrices whereas the encapsulating material 4 is selected between acrylic resins, polyimides, polystyrene and polysulfones and consists in shells having a thickness comprised between 5 and 50 μm, preferably between 10 and 30 μm.

The desiccant composition according to the present invention is suitable to be dispensed through the methods commonly used in manufacturing and laboratory processes, for example needle dispensing, jet dispensing, screen printing, blading, dipping. Desiccant bodies or films can finally be easily obtained by thermal treatment, usually comprised between 80 and 200° C.

Said desiccant bodies or films essentially maintain the same chemistry of the dispensable desiccant composition, only minor changes due to the consolidation polymerization mechanism may be observed, because no solvent is used in their formulation.

Deposition of the desiccant composition or insertion of pre-formed bodies or films can be suitably carried out in the manufacturing processes of electronic devices wherein an exposure to environmental humidity can occur for an extended period, even up to 24 hours, without a degradation of the moisture sorption properties that could render ineffective its performance for the protection of the electronic devices.

The invention will be now illustrated by the following not limiting examples.

EXAMPLE 1

A polymer-encapsulated desiccant according to the present invention is produced by spray-drying a stock solution containing the desiccant powder particles (CaO, 22.5 grams) dispersed in a suitable suspending agent (toluene, 1425 grams) in which the encapsulating polymer is dissolved (PMMA, 52.5 grams). The solution is sprayed at high temperature to promote fast evaporation of the suspending agent (toluene, 120° C.).

The collected powder (5 grams) is added with a non-encapsulated desiccant (CaO, 17.5 grams) to a polymeric matrix (epoxy resin, 27.5 grams). The mixture is mechanically mixed and kept in a refrigerated, dried atmosphere.

The desiccant sample is then obtained by blading on a stainless steel substrate and finally curing at 150° C. for 1 hour.

The sorption properties of the desiccant sample have been tested by gravimetric test at 22° C. and 55% R.H. showing that, after a 24 hours exposure, a residual sorption capacity of 80% has been maintained.

EXAMPLE 2

A polymer-encapsulated desiccant according to the present invention is produced by spray-drying a stock solution containing the desiccant powder particles (CaO, 22.5 grams) dispersed in a suitable suspending agent (toluene, 1425 grams) in which the encapsulating polymer is dissolved (polysulfone PSU, 52.5 grams). The solution is sprayed at high temperature to promote fast evaporation of the suspending agent (toluene, 120° C.).

The collected powder (7.5 grams) is added with a non-encapsulated desiccant ($Li_2O$, 17.5 grams) to a polymeric matrix (epoxy resin, 27.5 grams). The mixture is mechanically mixed and kept in a refrigerated, dried atmosphere.

The desiccant sample is then obtained by blading on a stainless steel substrate and finally curing at 150° C. for 1 hour.

The sorption properties of the desiccant sample have been tested by gravimetric test at 22° C. and 55% R.H. showing that, after a 24 hours exposure, a residual sorption capacity of 85% has been maintained.

EXAMPLE 3

Comparative

A polymer-encapsulated desiccant is produced by dispersion of a non-encapsulated desiccant (CaO, 25 grams) into a polymeric matrix (epoxy resin, 25 grams). The mixture is mechanically mixed and kept in a refrigerated, dried atmosphere. An homogenization step with a three-roll mill is performed, if required.

The desiccant sample is then obtained by blading on a stainless steel substrate and finally curing at 150° C. for 1 hour, and tested in the same conditions of example 1. After a 24 hours exposure a residual sorption capacity of only 70% has been observed.

EXAMPLE 4

Comparative

A polymer-encapsulated desiccant is produced in the same manner of example 3 but with a further deposition step of a PMMA layer covering the sample surface. The PMMA layer is obtained by blading a polymer solution (35% wt) in toluene, followed by a mild thermal treatment (5 min at 60° C.) to remove the solvent.

The desiccant sample is then tested in the same conditions of examples 1 and 2. After a 24 hours exposure a residual sorption capacity of only 70% has been observed, very similar to the sorption properties of sample 3 previously described.

The invention claimed is:

1. A desiccant composition containing
   a polymeric binder,
   a dispersion of a first amount of powder of at least one desiccant material dispersed in said polymeric binder, and
   a dispersion of a second amount of powder of at least one desiccant material, said second powder being in the form of aggregates surrounded by a shell of an encapsulating material having a different composition with respect to the polymeric binder.

2. The desiccant composition according to claim 1, wherein said desiccant materials are selected from the group consisting of alkaline oxides, alkaline-earth oxides, molecular sieves and aluminosilicates.

3. The desiccant composition according to claim 2, wherein said alkaline and alkaline-earth oxides are selected from the group consisting of lithium, magnesium, calcium, strontium or barium oxides.

4. The desiccant composition according to claim 1, wherein said first and second desiccant materials have the same chemical composition.

5. The desiccant composition according to claim 1, wherein at least one of said first or second desiccant materials are surface modified with organic groups.

6. The desiccant composition according to claim 1, wherein a sum of said first and second desiccant materials corresponds to a weight concentration between 30% and 60% with respect to a total composition weight.

7. The desiccant composition according to claim 1, wherein the weight ratio between the first amount of desiccant material and the second amount of desiccant material is comprised between 2:1 and 6:1, a weight of the second desiccant material including also a weight of the encapsulating material.

8. The desiccant composition according to claim 7, wherein the weight ratio is between 2:1 and 5:1.

9. The desiccant composition according to claim 1, wherein said polymeric binder is selected from the group consisting of epoxy resins, epoxyacrilic resins, perfluoropolyethers resins, and siloxane matrices.

10. The desiccant composition according to claim 1, wherein said shells of encapsulating material have a thickness between 5 µm and 50 µm.

11. The desiccant composition according to claim 10, wherein the thickness is between 10 µm and 30 µm.

12. The desiccant composition according to claim 1, wherein the encapsulating material is selected from the group consisting of acrylic resins, polyimides, polystyrene and polysulfones.

13. A moisture-sensitive device containing a desiccant body or film consisting of the desiccant composition according to claim 1.

14. The moisture-sensitive device according to claim 13, wherein said moisture-sensitive device is selected among a group of micro-electromechanical devices, micro-opto-electromechanical devices, opto-electronic devices for telecom applications, medical implantable devices and organic electronic devices.

* * * * *